United States Patent [19]
Fahs, II

[11] Patent Number: 5,353,745
[45] Date of Patent: Oct. 11, 1994

[54] AQUACULTURE SYSTEM AND METHODS FOR USING THE SAME

[76] Inventor: Richard W. Fahs, II, 71 Overlook Dr., Danville, Pa. 17821

[21] Appl. No.: 953,432

[22] Filed: Sep. 29, 1992

[51] Int. Cl.$^5$ ............................................. A01K 63/00
[52] U.S. Cl. .................................................... 119/226
[58] Field of Search ............... 119/215, 217, 218, 236, 119/204, 205

[56] References Cited

U.S. PATENT DOCUMENTS

| | | | |
|---|---|---|---|
| 405,713 | 6/1889 | Lugrin et al. | |
| 3,155,609 | 11/1964 | Pampel | 210/3 |
| 3,473,509 | 10/1969 | Miyamura | 119/2 |
| 3,495,572 | 2/1970 | Groves | 119/3 |
| 3,661,262 | 5/1972 | Sanders | 210/169 |
| 3,735,736 | 5/1973 | Yee et al. | 119/2 |
| 3,765,372 | 10/1973 | Moe, Jr. et al. | 119/3 |
| 3,769,176 | 10/1973 | Hise et al. | 195/142 |
| 3,773,014 | 11/1973 | Ewald, Jr. | 119/3 |
| 3,984,313 | 10/1976 | Higgins | 210/26 |
| 4,003,337 | 1/1977 | Moore | 119/3 |
| 4,038,945 | 8/1977 | Taborsky | 119/3 |
| 4,043,299 | 8/1977 | Birkbeck et al. | 119/227 |
| 4,052,960 | 10/1977 | Birkbeck et al. | 119/3 |
| 4,077,158 | 3/1978 | England | 47/59 |
| 4,182,267 | 1/1980 | Kominami et al. | 119/3 |
| 4,182,268 | 1/1980 | Berger | 119/3 |
| 4,213,421 | 7/1980 | Droese et al. | 119/3 |
| 4,221,187 | 9/1980 | Casey | 119/3 |
| 4,446,229 | 5/1984 | Indech | 435/1 |
| 4,722,902 | 2/1988 | Harm et al. | 435/284 |
| 4,738,220 | 4/1988 | Ewald, Jr. | 119/3 |
| 4,913,093 | 4/1990 | VanGorder | 119/3 |
| 4,966,096 | 10/1990 | Aday | 119/3 |
| 5,002,890 | 3/1991 | Morrison | 435/286 |
| 5,026,650 | 6/1991 | Schwarz et al. | 435/286 |
| 5,038,715 | 8/1991 | Fahs, II | 119/3 |

FOREIGN PATENT DOCUMENTS

| | | | |
|---|---|---|---|
| 0131585 | 4/1960 | U.S.S.R. | 119/3 |
| 0897190 | 1/1982 | U.S.S.R. | 119/3 |
| 1110427 | 1/1983 | U.S.S.R. | 119/3 |
| 1409176 | 1/1988 | U.S.S.R. | 119/3 |
| 2016882 | 9/1979 | United Kingdom. | |
| 1555311 | 11/1979 | United Kingdom. | |

OTHER PUBLICATIONS

Stickney, "Culture of Nonsalmonid Freshwater Fishes", pp. 140, 145, 181,184–187.
Ehrlich et al., "Phosphorus Control in Aquaculture by Bacterial Augmentation", presented to American Fish- (List continued on next page.)

Primary Examiner—Thomas Price
Attorney, Agent, or Firm—Panitch Schwarze Jacobs & Nadel

[57] ABSTRACT

The present invention is directed to apparatus and a method for maintaining and growing a primary cultured species and secondary organisms essential to the growth of the primary species in an aquaculture system in which the parameters which affect the maintenance and growth of the primary cultured species are carefully monitored and adjusted on a substantially continuous basis. The apparatus comprises a tank for holding an aqueous medium and the primary species, nutrient supply equipment, equipment for selectively removing the aqueous medium from the tank, apparatus for removing particulate matter from the aqueous medium removed from the tank, a sterilizer for sterilizing the aqueous medium removed from the tank, equipment for removing toxins from the aqueous medium removed from the tank without biological filtration, and a station with associated equipment for bringing the aqueous medium to a steady state suitable for the growth and survival of the primary species. Conduits, pumps and associated valving are provided for transferring the aqueous medium among the various treatment stations and for returning the aqueous medium to the tank after it has been treated by any or all of the foregoing treatment equipment.

31 Claims, 5 Drawing Sheets

OTHER PUBLICATIONS eries Society, Bio-Engineering Symposium, pp. 1–9, Oct. 1988.

Ehrlich et al., "BioAugmentation: Biotechnology for Improved Aquacultural Production and Environmental Protection", In: *Acqaculture Engineering Technologies for the Future* (K. Murray, ed.). Inst. Chem. Eng., U.K. Symp. Ser. No. 111., pp. 329–341, 1989.

Ehrlich et al., "Biotechnology in Aquaculture: Letting Mother Nature Work for You", Presented to Scottish Fish Farming Conference, pp. 1–6, (Feb. 15, 1990).

Letter from Karl F. Ehrlich, Ph. D. to Mr. Richard Fahs dated Jun. 18, 1990 regarding "Sludge Removal in Settling Ponds or Lakes or Under Nets or Pens", Advertisement for BACTA-PUR TM.

"Cell Cultures Can be Grown or Maintained Under Controlled Conditions", Technical Support Package for Perfusion Bioreactor Module MSC-21361, *NASA Tech Briefs*, p. 113 (Jul. 1990).

AQUACULTURE SYSTEM AND METHODS FOR USING THE SAME

FIELD OF THE INVENTION

The present invention relates to an apparatus for raising aquatic organisms, specifically fish, and methods for using the same.

BACKGROUND OF THE INVENTION

Aquaculture is used increasingly for raising or growing and harvesting aquatic species for a variety of uses, including seeding for repopulating natural environments, stocking recreational resources for sport, supplying species for use in controlling other species in certain environments, and for use as food, for example. Many conventional aquaculture systems are known and are supplied for a variety of species in situations, such as growing or sustaining life in natural environments, growing or sustaining life in outer space and growing and sustaining life in man-made systems. Generally, aquatic systems can be classified in one of two ways: closed or open systems. Open systems are most easily typified by natural environments, such as lakes and streams. Closed systems may be quasi-closed systems, such as outdoor fish raceways where a portion of the output may be recycled as part of the new input, but the system is subject to an otherwise natural environment, and totally closed systems, such as an aquarium and those used in outer space and laboratory environments. Regardless of which system is utilized, an organism's optimal growth and survival is directly related to that organism's environment and nutrition. In a truly closed system, the environment of an organism must be monitored and regulated to provide the optimal parameters for the organism's survival. Even open systems must allow for removal of pollutants and waste by-products from the system to assure organism viability.

It is generally recognized in the aquaculture industry that closed systems provide a more convenient way to control the various parameters for successful organism growth. To remove harmful waste products and pollutants, such as nitrogenous waste and fecal matter excreted by vertebrates, for example, one prevalent method is the use of biological filters. Aquaculture systems for raising fish, other aquatic life and/or bacteria utilize biological filters to remove or convert to non-toxic products nitrogenous waste and other undesirable contaminants. Biological filtration is typified by rotating biological filters, trickle filters, fluidized beds, bead filters and other apparatus in which the contaminant-absorbing or converting bacteria and/or plant forms are contained.

The problem with biological filtration is the tendency or, some would say, the inevitability of such a system crashing or destroying itself following a variety of complex chemical and biological processes. For example, where fish are raised in a closed system environment, the respiratory or excretory by-products, if allowed to concentrate and convert to toxic substances, ultimately doom the system to failure, despite the use of biological filtration. Even in a flow-through (i.e., open) system, where the by-products and the pollutants they form are theoretically continually diluted and flushed away, it is questionable whether such flushing is sufficient to remove the toxic agents to a point where the primary or target organism desired ("primary organism" as more particularly defined hereinafter) is successfully maintained and allowed to grow.

Conventional biological filters for use in closed aquaculture systems generally require large surface areas for nitrifying bacteria and other bacteria to grow. However, biological filters are non-specific. That is, not only are biological filters inhabited by nitrifying and other desired bacteria, but many disease-causing bacteria, along with undesirable or useless bacteria, fungi, molds and viruses, can infect and inhabit the biological filter. Considering the bacteria, for example, once the population of aerobic bacteria increases, a biological slime layer is formed, which adds contaminants to water or other aqueous medium passing through the filter. Aerobic bacteria typically present throughout this slime layer will lyse and release their own respiratory and internal substances into the system water. The slime layer tends to increase in depth, forming an anaerobic layer where anaerobic bacteria can proliferate and produce many harmful substances. Such bacteria may be disease-causing bacteria which may have the ability to act upon the same substances as the beneficial bacteria of the biological filter, therefore masking the effectiveness of the beneficial bacteria. Thus, while ammonia and certain other contaminants may be converted into non-toxic products or in some instances removed by biological filtration, many other contaminants derived from these living filters can be introduced into the system.

Any essential or non-essential secondary organism (as hereinafter defined) will release to the environment a range of chemicals and substances due to that organism's growth, death and organic processes. These substances interact with the primary organism's released substances along with other created or converted substances to create an endless list of possible contaminants which concentrate in the system's environment, dooming the system to failure as a support environment for the primary organism within time. The constant interaction and changes in the chemistry of the environment result in the need for an organism to change or evolve to meet these new environmental conditions or the organism will fail or die. To maintain an organism at its current stage of evolution, all environmental conditions must remain the same or in a steady state. All contaminants released by the primary organism or its essential secondary organisms must be identified and removed thoroughly from the environment. The environment must be monitored to identify any unknown minor contaminants, which in time could alter the environment. These new contaminants must be removed from the system to maintain the primary organism of the closed system. Evolution should only occur through genetic change. If this change is undesirable, genetic manipulation or selective breeding can be introduced to correct the change. If the change is desired and created through genetic change or selective breeding and the desired change alters the environmental needs of the organism, then the steady state or extraction process can be modified to meet any new requirements.

In addition, the environmental conditions optimal for sustaining the primary organism for which the aquaculture system is established, e.g., fish of one or more species, but preferably a single species, may not be the same conditions optimal for the biological filter organisms (e.g., bacteria). Accordingly, effective biological filtration requires an environment suitable for the bacteria or other biological filter organism, which may be incompatible or even detrimental to the primary organism being cultivated. Thus, it becomes necessary to continuously alter the environment either for efficient primary organism growth or for efficient biological filtration or provide a single compromise environment suitable for both the primary organism and the biological filter at the expense of peak cultivation and filtration most beneficial to the primary organism.

The interaction between the primary organism targeted for cultivation in the aquaculture system and the biological filter or secondary organisms, their particular growth environments and their respective respiratory and other by-products creates, over time, a closed aquaculture system that is either doomed for failure or in need of total media replacement, such as exists in open systems.

The present invention overcomes the inefficiencies and deficiencies of the prior art by the virtue of an improved closed aquaculture system that is more reliable, simplifies the complex requirements of conventional systems and, by its ability to change with varying conditions, it lessens the likelihood of the system crashing.

SUMMARY OF THE INVENTION

One aspect of the present invention is a closed aquaculture system for maintaining and growing a single primary cultured species and secondary organisms essential to growth and survival of the primary species comprising (a) a tank for holding an aqueous medium, the primary species and any essential secondary organisms; (b) means for adding nutrients to the tank; (c) means for selectively removing the aqueous medium from the tank; (d) means for removing particulate matter from the aqueous medium removed from the tank; (e) means for sterilizing the aqueous medium removed from the tank; (f) non-biological means for removing toxins from the aqueous medium removed from the tank; (g) means for bringing the aqueous medium removed from the tank to a steady state suitable for the growth and survival of the primary species; and (h) means for returning the aqueous medium to the tank after the aqueous medium is treated by any or all of the means of components (d), (e), (f) and (g).

Another aspect of the present invention is a method for maintaining and growing a single primary cultured species comprising the steps of (a) supplying the primary species to a tank containing an aqueous medium; (b) adding nutrients to the tank; (c) continuously removing portions of the aqueous medium from the tank for treatment until eventually all of the aqueous medium is removed from the tank; (d) removing particulate matter from the removed portion of the aqueous medium; (3) sterilizing the removed portion of aqueous medium to neutralize and remove nonessential secondary organisms from the removed portion; (f) removing toxins from the removed portion of aqueous medium without biological filtration; (g) bringing the aqueous medium removed from the tank to a steady state suitable for growth and survival of the primary species; and (h) returning the aqueous medium to the tank after any or all of treatment steps (d), (e), (f) and (g) have been performed.

DETAILED DESCRIPTION OF THE PREFERRED EMBODIMENTS

Figure 1:
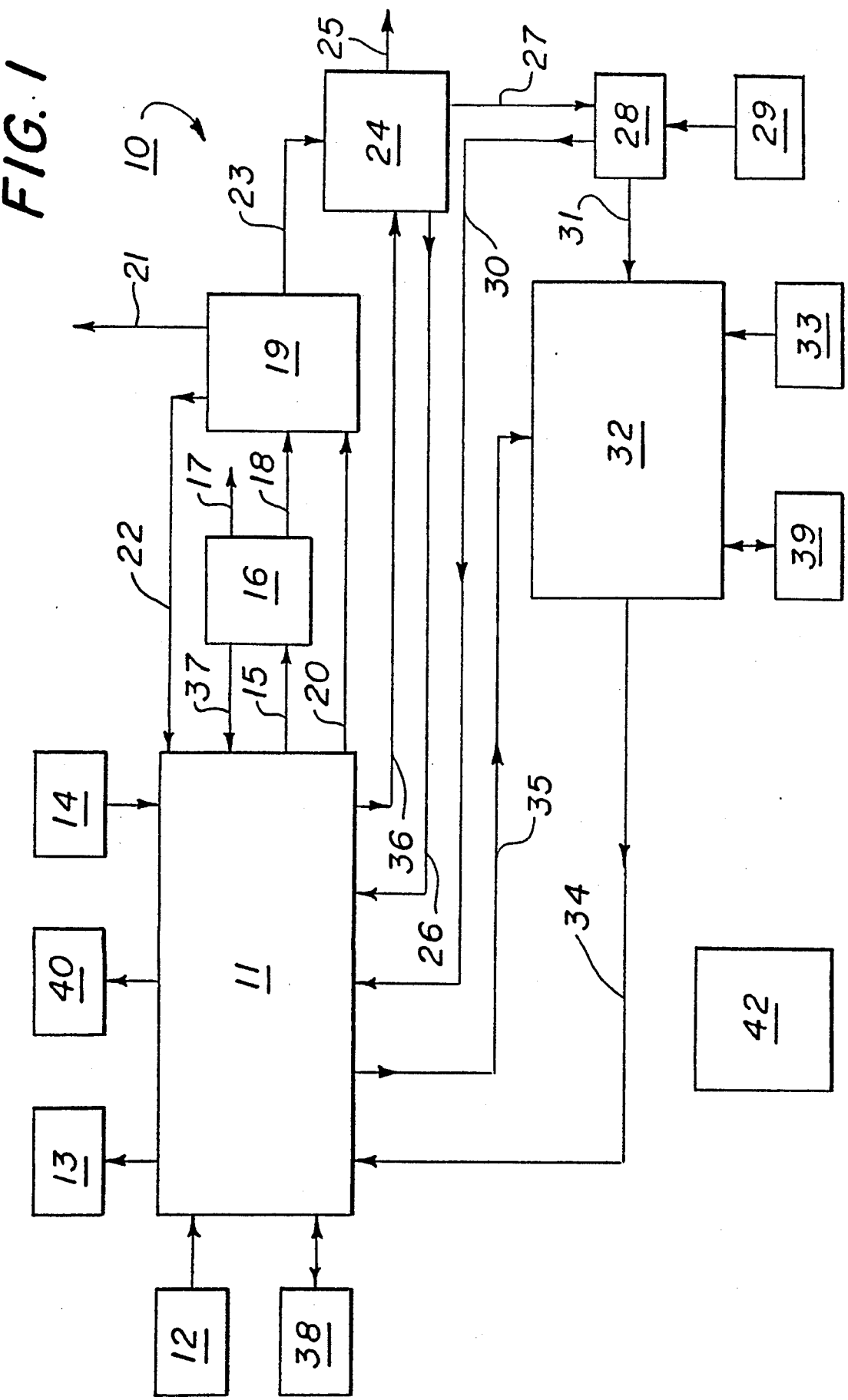
FIG. 1 is a schematic illustration of a closed aquaculture system according to the present invention.

Referring to the drawings, wherein like numerals indicate like elements throughout, there is shown in FIG. 1 a closed aquaculture system 10 for raising or growing a primary cultured species in the absence of all other species and organisms except those essential secondary organisms necessary to sustain and grow the cultured species. The present invention is discussed and illustrated using fish of any desired species as the typical cultured organism. However, it will be readily apparent to one of ordinary skill in the biological arts in view of this disclosure that the aquaculture system according to the present invention may be readily adapted to virtually any aquatic life, including microorganisms, such as bacteria and certain algae, as well as microorganisms, such as certain other algae, crustaceans, such as shrimp and lobster, and aquatic vertebrates other than fish.

As used herein, the terms "primary organism," "primary cultured organism," "primary cultured species" or "primary species" means an organism (together with and including any "essential secondary organisms" as hereinafter defined), the cultivation of which is desired and for which the aquaculture system is designed. For example, where it is desired to raise or grow brook trout, the primary cultivated species is that species of fish limited to brook trout.

As used herein, the term "essential secondary organism" means those organisms which provide a direct survival benefit to the primary cultured species. If this essential secondary organism is not present, the primary organism would die. The benefit that this essential secondary organism provides cannot be provided to the primary organism unless directly provided by the secondary organism. The essential secondary organism need not be present if the benefit it provides to the primary species can be provided via a non-biological means. For example, the bacteria found in the gut of a particular primary species which are essential for that primary species' digestion of a particular mineral or vitamin and which is not able to be introduced into the tank with the other desired nutrients, are considered essential secondary organisms. As another example, the algae which grow in the tissue of certain sea anenomes are considered to be essential secondary organisms to those certain sea anenomes.

All other species and secondary organisms which do not provide a direct benefit to the cultured organism and which are not essential to the maintenance or growth of the primary cultured species are "non-essential secondary organisms." In addition, essential secondary organisms may become non-essential secondary organisms where there is an excess of the organism. For example, where an essential secondary organism proliferates to a point where the excess of secondary organisms is no longer essential to the maintenance or growth of the primary cultured species, that portion of the secondary organisms which is in excess and non-essential may be classified as a non-essential secondary organism.

As used herein with respect to the aquaculture system 10 of the present invention, the term "non-biological" means that the apparatus process or technique being described as "non-biological" does not contain or use any life form to treat any component of or living organism within the aquaculture system. The presence of an organism being treated within the aquaculture system is not included in the definition of "non-biological." Thus, even though a nonessential secondary organism may be treated, say in the sterilizer, the mere presence of that nonessential secondary organism for treatment, neutralization and removal does not make the sterilizer a biological treatment means.

There is schematically illustrated in FIG. 1 an aquaculture system 10 comprising a tank or chamber 11 for containing an aqueous medium, such as water, which may be fresh water or salt water, or any other aqueous medium suitable for aquatic life, and a single primary cultured species, such as fish of a particular species (not shown), along with essential secondary organisms. Associated with the tank or chamber 11 as schematically illustrated without regard for the particular points of connection to the tank 11 are various other components, conduits, pathways and the like. While there are or may be preferred or optimum locations for the various components directly associated with the tank, those locations will be specified hereinafter in connection with a discussion of the particular components. The various valved conduits or pathways are shown schematically without reference to any particular type of valve or means for selectively closing the pathway, since one skilled in the art could readily determine the appropriate type of component in view of the particular use of the component. The schematic illustration of FIG. 1 includes arrowheads indicating the general direction of the flow of medium or other material throughout the system. Pumps are not shown, but one skilled in the art could readily determine where pumps should be placed, the type of pump to use and the direction in which the pump would pump the fluid, particularly in view of the directional arrows and in view of the context of this disclosure.

As shown in FIG. 1, associated with tank 11 is a source 12, typically in the form of a holding tank, of the primary cultured species, together with a means of introducing the primary species to the tank, such as a gated passageway or the like. A harvesting component 13 comprising a tank or other container or area for harvesting the primary species after it has reached the desired growth stage is also associated with tank 11. The harvesting component may also be used to remove either the primary species, or essential or non-essential secondary organisms from the tank when and as desired.

A nutrient supply means 14, such as a means for feeding or supplying desired vitamins, minerals or other nutrients to the primary organism and any essential secondary organisms, is associated with tank 11. A valved conduit 15 allows for the selective but preferably substantially continuous removal of a portion of the aqueous medium from the tank for treatment until eventually, all of the aqueous medium is removed from the tank. Any dissolved or suspended contaminants or nonessential secondary organisms are removed along with the removal of the aqueous medium, per se. This applies to any reference herein to the removal of any portion of the aqueous medium. Conduit 15 leads to a particulate matter removal means 16 for removing particulate matter from the aqueous medium. Waste particulate matter removed from the aqueous medium exits the system through waste outlet conduit or pathway 17 for appropriate disposal or additional treatment.

The aqueous medium treated in particulate matter removal means 16 is monitored for appropriate quality. If the quality is sufficient for the continued survival and growth of the primary species, all or a portion of the treated aqueous medium may be returned to tank 11 through a valved conduit 37. Otherwise, if additional treatment is necessary, the treated aqueous medium then leaves means 16 through a valved conduit 18, where it travels to a sterilizer 19 where all overpopulated organisms, nonessential secondary organisms or other non-essential organic matter are killed and removed or removed via waste outlet conduit 21. As used herein, "sterilize" and associated terms means to kill and remove from the aqueous medium undesired living organisms or to remove from the aqueous medium undesired living organisms or other contaminants which adversely affect the survival or growth of the primary species.

The purity of the aqueous medium treated in sterilizer 19 is monitored. If it is of sufficient purity, all or a portion may be recycled through return conduit 22 to tank 11. If it is determined through monitoring that the aqueous medium does not have sufficient particulate matter to require treatment in the particulate matter removing device 16, the aqueous medium can be routed directly from tank 11 to sterilizer 19 through a valved conduit 20.

Aqueous medium which has been sterilized in sterilizer 19 may be routed for further treatment through a valved conduit 23 to a non-biological toxin removal device 24. This device can remove toxins by various known techniques generally described hereinafter. The toxins so removed exit from the system through a valved conduit 25. If the aqueous medium as treated in particulate removal device 16, sterilizer 19 and non-biological toxin removal device 24, or through evaporation, has not resulted in the loss of too much of the aqueous medium, and needs no steady state adjustment, the aqueous medium is returned to the aquaculture growth tank 11 through a valved conduit 26.

There are times when the aqueous medium becomes depleted as a result of evaporation or prior treatment, or the medium needs to be brought to a steady state suitable for the survival or growth of the primary species. In these circumstances, the treated medium exiting the non-biological toxin removal device 24 is routed through a valved conduit 27 to a new medium receiving chamber 28 which is supplied with new medium, if needed, from source 29. From new medium receiving chamber 28 the mixture of new and previously treated aqueous medium may be routed directly through a valved conduit 30 into tank 11 if no steady state adjustment is needed. However, preferably, to allow for a period of acclimation, adjustment and initial treatment of the new medium, or adjustment of the existing medium, with or without earlier pretreatments, the mixture is preferably routed through a valved conduit 31 into a steady state chamber 32. In steady state chamber 32, if necessary or desired, essential secondary organisms, desirable chemicals or other ingredients for the aqueous medium can be added to the steady state chamber from source 33.

Other treatments may be desirable for the medium in steady state chamber. Such other treatments may take place in any suitable type of supplemental treatment station, designated generally as 39, as desired, depending on the primary species, essential and non-essential secondary organisms, condition of the medium, presence and type of contaminants, environmental factors, and the like. As schematically indicated by arrowheads of opposite direction, the medium or organisms may be transferred between steady state chamber 32 and supplemental treatment station 39 by any suitable conduit, passageway or other means, having appropriate valves, gates or other control elements. One example of a supplemental treatment station 39 is a gas injector, which may be of a type illustrated in FIG. 6 and described hereinafter in detail.

After a predetermined residence time within steady state chamber 32, the acclimated medium or organisms may be conveyed through a conduit 34 into tank 11.

In some instances, only certain treatments, rather than all treatments, are desired for the aqueous medium. In this case, as described above with respect to the direct transfer of aqueous medium from tank 11 to sterilizer 19 via conduit 20, a valved conduit 35 allows the transfer of aqueous medium from tank 11 directly to steady state chamber 32. A valved conduit 36 allows the transfer of aqueous medium from tank 11 directly to non-biological toxin removal device 24.

A health control chamber or area 38 is also associated with growth tank 11. As schematically indicated by arrowheads of opposite direction, health control chamber or area 38 may receive from tank 11 diseased fish or other primary species and return them to tank 11 after being treated within chamber or area 38. Alternatively and included within the schematic representation of chamber or area 38 is a source of supply of medication which could be used to treat a portion or the entirety of growth tank 11, if necessary.

A chamber 40 is provided for holding overflow, excess or removed aqueous medium or any other components of the system.

It is strongly preferred that all processes and components be non-biological for the reasons set forth above relating to the problems associated with the prior use of biological filters. Contaminants must not be introduced into the aqueous medium by any treatment components unless the contaminant is removed before the medium is returned to tank 11.

FIG. 1 also includes a schematic representation of a control means 42 for monitoring and adjusting various parameters associated with the system, including equipment operation, environmental stimuli of the organisms within the system or quality of the aqueous medium or organisms within the system. Such parameters may include, without limitation, valve operation, pump operation, temperature, light, pressure, flow rates, sound or the content or value in the aqueous medium of metals, minerals, ions, pH (via control of acidity and/or alkalinity), specific gravity, amino acids, proteins, dissolved gases (such as nitrogen, oxygen and carbon dioxide, for example), carbon or calcium, among others.

To control these parameters, the aquaculture system of the present invention would have a vast array of interconnected sensors, monitors and remotely controllable adjusting mechanisms (pumps, valves, heaters, chemical supply sources, treatment means, switches, etc.), preferably under the control of a computer employing a data processing means. The computerized data processing means would allow the setting of target parameters, the sensing and monitoring of variations from the target parameters, the control of devices necessary to bring the parameters within specifications of the targets, and various display and reporting means. All of these types of sensing, monitoring, adjusting, displaying and reporting functions would be well within the level of skill of a computer programmer and/or computer systems analyst whom would be provided with the specifications of the various parameters for the control means. Accordingly, it is not believed to be necessary to explain in detail the programming and operation of the control means 42. The use of the control means 42 allows the complete control of all parameters and factors which would affect and optimize the survival, growth and development of the primary organism, as well as the efficient management of the operation of the entire aquaculture system.

Having described the overall system 10 with reference to FIG. 1, there follows a description of various components of the system and their use according to the present invention.

The growth tank or chamber 11 may take a variety of forms but should be constructed of materials which are inert, allow for relatively easy cleaning, and inhibit build-up of dirt and growth of non-essential organisms. To facilitate cleaning, it is presently preferred that tank 11 be provided with smooth surfaces, with few, if any, angled corners to allow vacuum apparatus or other cleaning devices to be used easily and without interruption. Tank 11 is also preferably provided with color and/or shading suitable to the primary cultured species, most preferably mimicking the primary cultured species' natural habitat to minimize stress to the primary cultured species.

Tank 11 is also preferably provided with environmental stimuli, such as light sources, wave makers, aqueous medium directional flow devices, sources of heat or cold, and other environmental stimuli suitable and/or necessary for a given primary species, which stimuli may be readily determined by one of ordinary skill in the art. The extent to which any or all of such environmental stimuli are used may be determined based on known natural environmental conditions of a given species, known environmental conditions for optimal growth of a given species and/or known environmental conditions for optimal maintenance of a given species. Moreover, where it is desired to provide a more natural environment for a given species, additional stimuli or objects may be utilized, such as streamers to simulate aquatic grasses or seaweed and objects of various shapes to simulate a reef or rock bed, for example. Tank inserts or forms (not shown) may be used to temporarily change the shape and/or color, for example, of the interior of the tank where it is intended to use the tank at different times for different primary cultured species.

Figure 2:
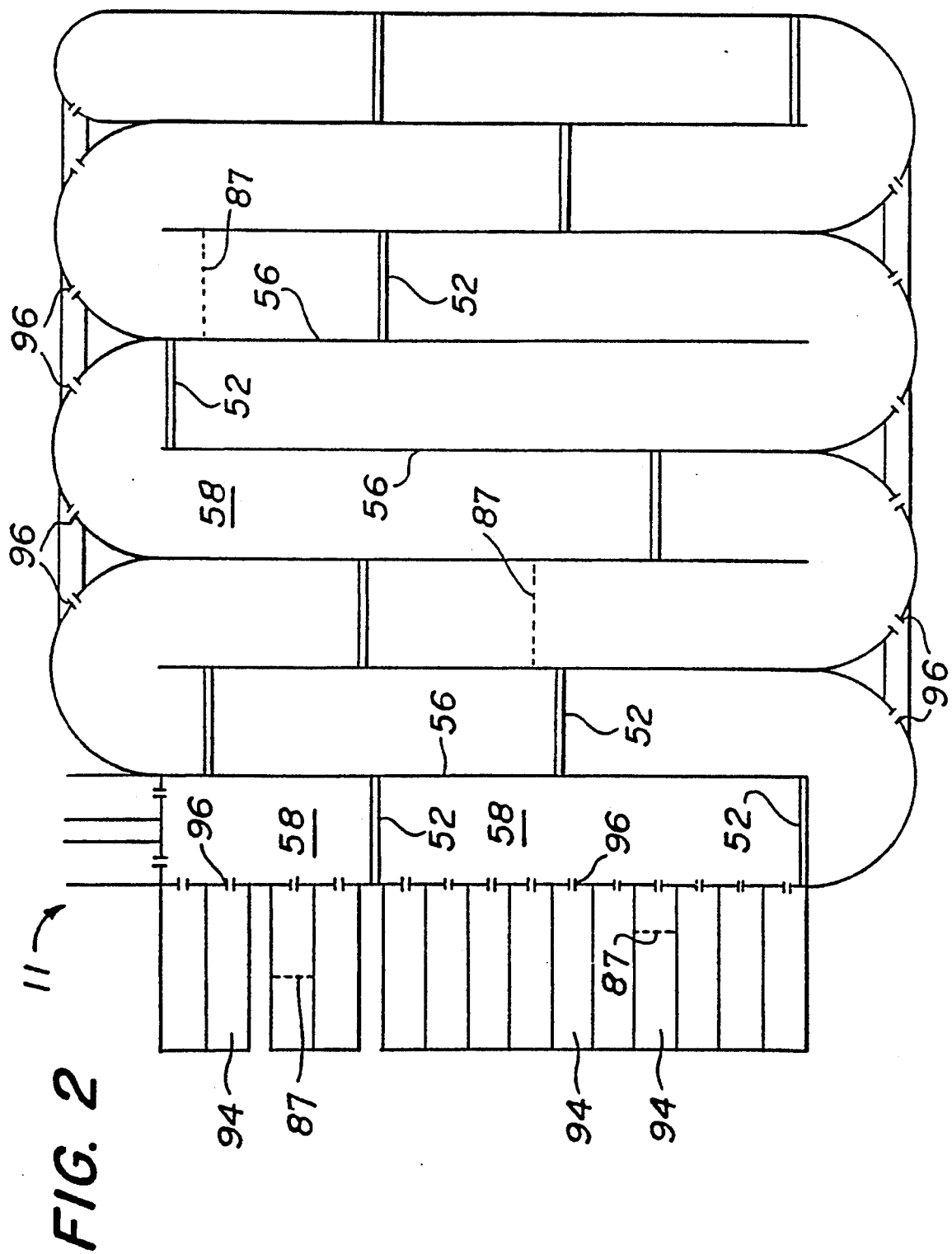
FIG. 2 is a schematic illustration of a tank for a primary cultured species in accordance with the present invention.
Figure 3:
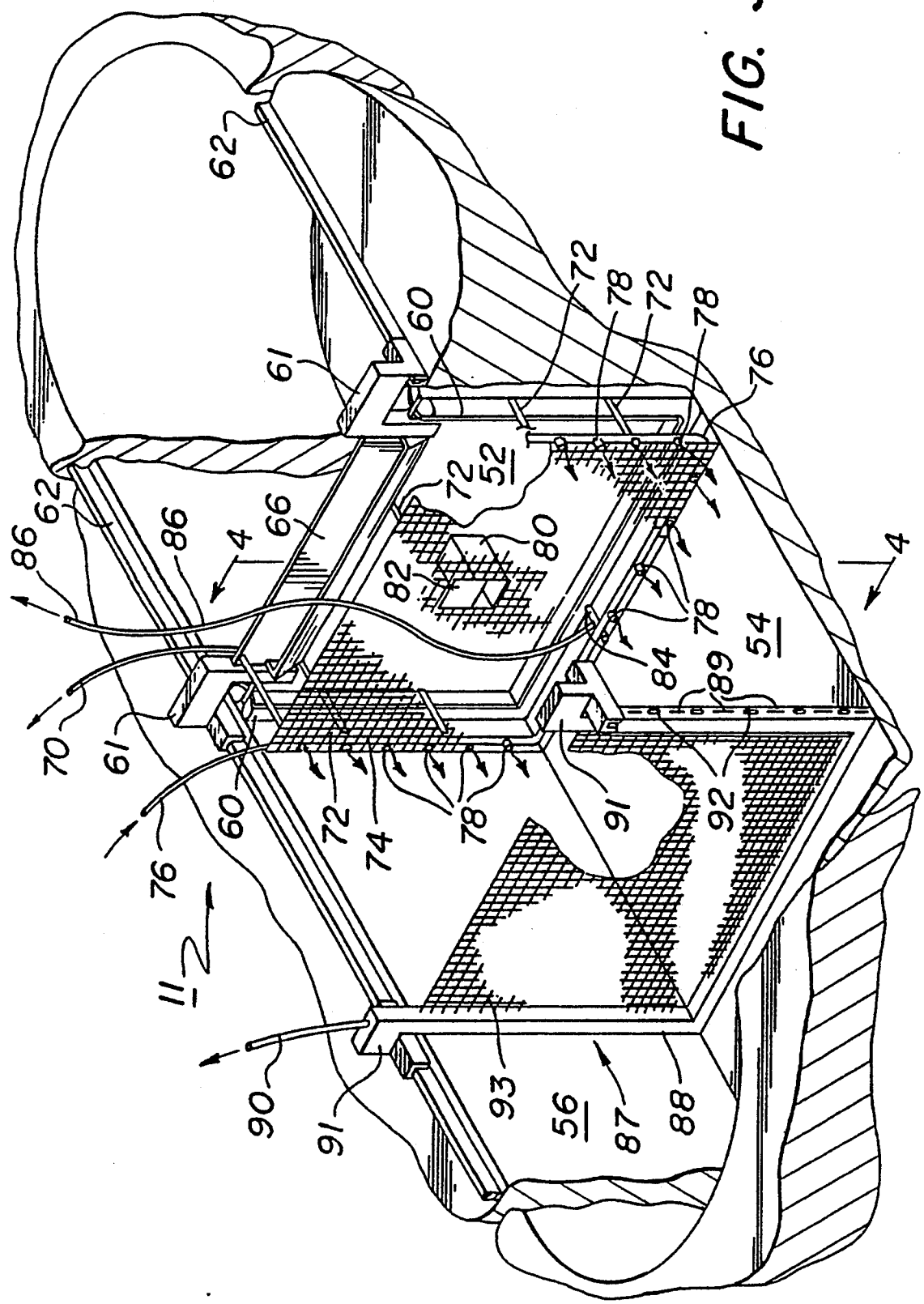
FIG. 3 is a partial perspective view, partially in cross-section, with certain components removed for clarity of illustration, of a portion of one embodiment of a tank for a primary cultured species in accordance with the present invention.
Figure 4:
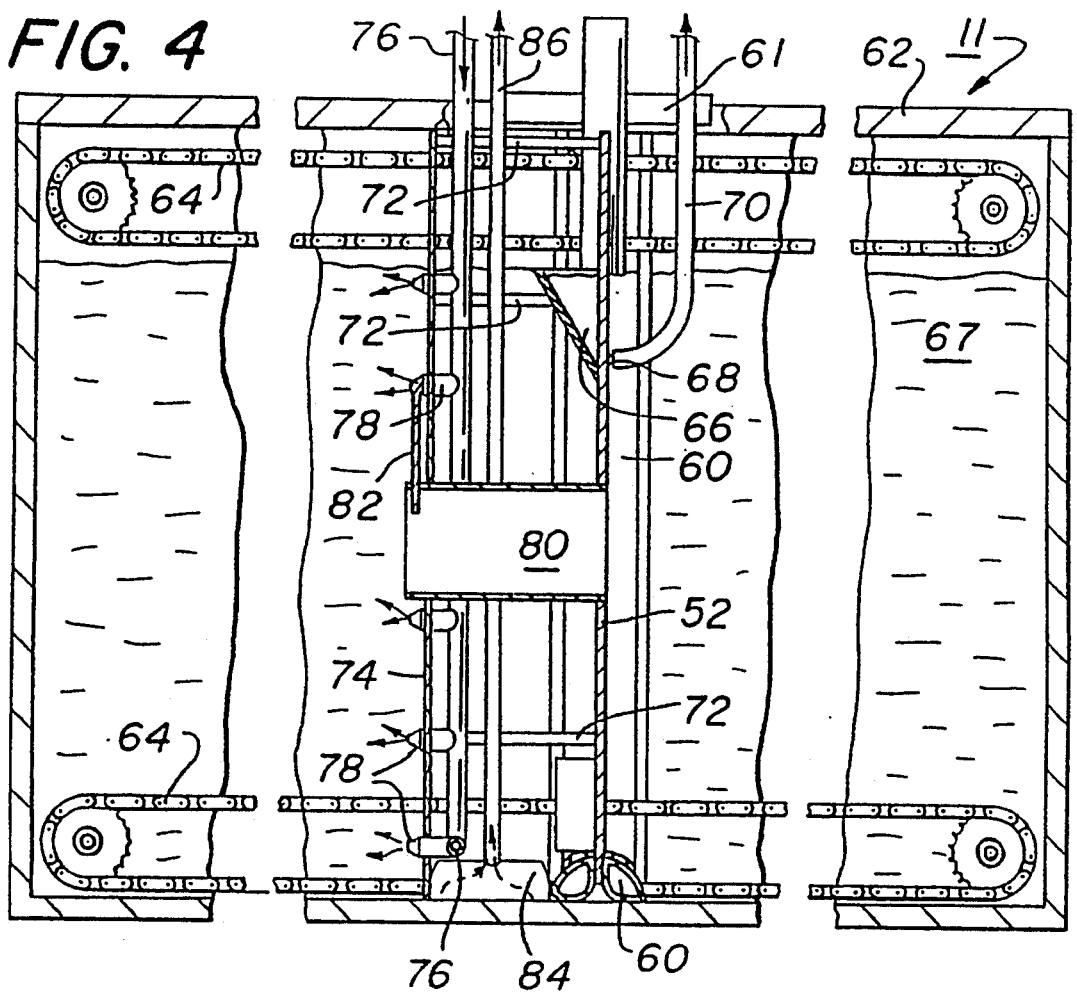
FIG. 4 is a partial vertical cross-sectional view of the tank taken along line 4—4 in FIG. 3.

Referring to FIGS. 2, 3 and 4, a presently preferred embodiment of growth tank 11 comprises a generally unified tank of serpentine shape, although other tank shapes and designs may be used. A plurality of wall dividers 52 extend from the floor 54 and between side walls 56 of the tank sections and are capable of totally isolating one section 58 of the tank from another. The dividing walls 52 may be provided with bladders 60, which may be selectively inflated to form a seal between the divider 52 and the floor 54 and walls 56 of the tank to isolate a particular section 58 of the tank, although other methods of isolating sections 58 may be used.

One skilled in the art will recognize in view of this disclosure that such a tank configuration will facilitate the growth of a single primary cultured species at various stages of its growth cycle. In addition, a tank 11 having isolated sections 58 will allow for isolation of diseased organisms, for example, and facilitate isolation of the primary species for harvesting.

Isolation of each section will also, among other benefits, (a) allow for optimal water volume utilization for each stage of growth; (b) permit different primary organisms with different medium and environmental filtration needs all to be grown within the same overall system; (c) provide for growth of a food source for the primary organism of one section in the section next to the primary organism, allowing a constant supply of food and ease of feeding of a purified food source; and (d) permit readily changing growth stimulus and medium requirements in each section to satisfy the requirements of the particular organism being cultured in that section.

Tank wall dividers 52 are preferably movable at least partially through tank 11 to allow the isolated sections 58 of tank 11 to be varied in size to accommodate the size or volume of the primary cultured species. Tank wall dividers 52 preferably are supported in a preferred embodiment by roller support members 61. Movement of tank wall dividers 52 may be performed by hand, for example, or preferably by automated equipment, along a pair of rails 62 shown in FIGS. 3 and 4, using a pair of endless chains 64 generally illustrated in FIG. 4, which are driven by one or more appropriately geared motors (not shown), although other methods of moving the tank wall dividers 52 may be used in accordance with the present invention.

Wall dividers 52 preferably contain a skimmer 66, in the shape of a generally triangular trough, located at the surface level of the water or other aqueous medium 67 within the tank. Skimmer 66 removes surface contaminants through a skimmer drain outlet 68 and associated skimmer drain tube 70. The contaminants are pumped to the particulate removal device 16 for filtration. The filtered aqueous medium can be returned to the tank.

A plurality of connecting bars or members 72 connect wall divider 52 to a frame for a grid 74. A liquid feed tube or manifold 76 feeds aqueous medium, which may be recycled from any of the treatment components described with respect to FIG. 1, through nozzles 78 arranged along at least the side and bottom edges of grid 74. Alternatively, the nozzles can be located on the opposite side of wall divider 52, to service the section to the right of wall divider 52 as illustrated in FIG. 4. The flow of liquid through nozzles 78 creates a flow for the circulation of the aqueous medium within the sections of the tank. The flow rate may be adjusted to create an appropriate movement of the aqueous medium within a section to simulate waves or current helpful or necessary for the development of particular primary fish species. A tunnel or passageway 80 allows the selective transfer of aqueous medium and any desired organisms between sections 58 of tank 11. A gate 82, which may be manually or otherwise opened and shut, controls the flow of material through tunnel 80. If desired, gate 82 may be activated by remote controlled automated equipment of any suitable type wellknown to those skilled in the art.

A gated tunnel is presently preferred, as opposed to other more stressful methods such as netting, for transferring primary cultured species, such as fish, between sections of the tank. A counting apparatus may be provided for counting the number of primary cultured species passing through tunnel 80. The counting apparatus may take the form of a light or sound grid having x, y, z transmitter/receiver coordinates, for example. The weight of the individual organisms of the primary cultured species may be determined using historical data based on the size and weight relationships of any particular primary species.

An area for settling of particulate material is formed between wall divider 52 and grid 74. Particulate material which is contained in this settling area is removed by a movable drain or vacuum system including a movable suction nozzle 84 connected to a flexible hose 86. Suction nozzle 84 is sized to fit the space between the divider wall and grid and may be moved manually or automatically along the bottom and/or side walls of the tank in the settling area. The particulate material removed by the movable drain or vacuum system through flexible hose 86 may be directed to particulate removal device 16 for filtration. The filtered aqueous medium may then be subjected to further treatments or returned to tank 11.

A suction drainage assembly 87, which optionally may contain sterilizing means, is movable within the various sections 58 of tank 11. Suction drainage assembly 87 comprises a hollow frame 88 with openings, such as slits 89 or holes, in the outer periphery of the sides and bottom of the frame through which the aqueous medium, particulate matter or other dissolved or suspended contaminants or non-essential secondary organisms may flow. A flexible hose 90 is connected at one end to a suitable fitting for fluid communication within hollow frame 88. The other end of hose 90 is connected to a suitable vacuum or suction source, which may be the same source connected to hose 86.

Aqueous medium and any contaminants within a section 58 are withdrawn from the section, through openings 89 in frame 88 and through hose 90 to particulate removal device 16, where the particulate contaminants are removed. The aqueous medium can then be routed through the other treatment chambers and stations as explained above, or if monitoring shows the aqueous medium is sufficiently decontaminated, may be returned directly to tank 11 through conduit 37.

Suction drainage assembly 87 is movable by manual or automatic reciprocation within a given section of the tank. Movement is facilitated by providing frame 88 with roller support members 91 for movement along rails 62.

Sterilizing means, depicted generally by reference numeral 92, optionally may be incorporated within frame 88 of suction drainage assembly 87. The sterilizing means may comprise, for example, ultraviolet lights, ozone ejection nozzles, sterilizing chemical nozzles, or the like. As the aqueous medium containing the contaminants moves past the sterilizing means, the organic contaminants are killed. The killed contaminants within the medium are then withdrawn from the tank through assembly 87 for removal by particulate removal device 16 and/or the other treatment chambers and stations.

Also attached conveniently to frame 88 is a screen 93, if desired. Screen 93 may have openings of various predetermined sizes to allow fish or other primary cultured species of one size to be separated from those of a larger size by allowing the smaller primary species to pass through the openings in the screen, protecting the smaller individuals from the larger individuals. The use of screen 93 allows the organisms to be separated without separating the aqueous medium in a particular section 58.

Although screen 93 is conveniently attached to the frame of suction drainage assembly 87, screen 93 could be attached to any other frame movable within the sections of the tank. Thus, the functions of the movable suction drainage assembly and the screen are distinct and these components may be totally separate from each other. It is generally preferred, however, to combine these components into a multifunctional unit for the sake of efficiency, even though in the combined, multifunctional unit, the suction drainage function and the screen grading function may be used independently.

While the tank 11 according to the present invention may comprise a single compartment or section, it is presently preferred that the tank 11 comprise a plurality of sections 58, as described above. Where the primary cultured species is a fish species, for example, one or more fingerling sections 94 may be provided to isolate very young fish from larger fish of the same fish species in subsequent isolated sections 58 of the tank 11 and/or to facilitate easier care of the young fish in a smaller and more economically controlled section of the tank. Subsequent sections may be increasingly larger to accommodate the increase in fish volume and size until a final isolated section, which is preferably the largest to accommodate the largest volume and size of fish being grown. Inlet and outlet gates 96 may also be provided at various sections along the tank to allow movement of fingerlings, for example, from the fingerling section 94 into the subsequent sections 58 of the tank, as well as to allow for removal of fish at various growth stages in the tank for inspection or treatment, for example.

The size of each isolated section may be determined by considering the specific growth rate for the individual primary cultured species and the size of the organism grown. The growth rates for the species grown will be determined by historical data for that specific species found in the literature as a starting point and will be revised via historical data provided by actual growth rates of the species grown within this system.

Preferably, the volume of each successive isolated section is larger than the volume of the preceding section. For example, the isolated section 58 into which fingerlings are released from the fingerling section 94 should have a volume larger than the volume of the fingerling section, if there is no loss of organisms or if all of the organisms in the previous section are moved and have grown in mass. The volume of the next section could be less if there is a reduction in the total organism mass due to any reason. An example would be the death and removal of a portion of the organism population, the removal of a portion of the population due to special treatment or harvesting or grading procedures, to mention a few. Another example would be when one section holds food (say small fish) for another, preferably adjacent section containing larger fish which feed on the small fish. The food section will reduce in volume as the food source diminishes, and the other preferably adjacent section increases in volume with the increase in biomass, due to the consumption of the smaller fish by the larger fish.

The volume of any section must be directly related to the volume of the aqueous medium needed to support the biomass of that section. One skilled in the biological arts will appreciate, however, that all variations in volume can be determined according to the particular primary cultured species involved and the growth or harvest desired, among other factors.

Organisms of primary cultured species are maintained in the tank 11 or associated areas, such as the source or holding tank 12, health control area 38 or harvest area 13 at all times during growth, where the species is fed and allowed to metabolize in preferably the most stress-free environment possible. Feeding from a schematically illustrated nutrient source 14 (FIG. 1) may be accomplished by any suitable feeding device.

Figure 5:
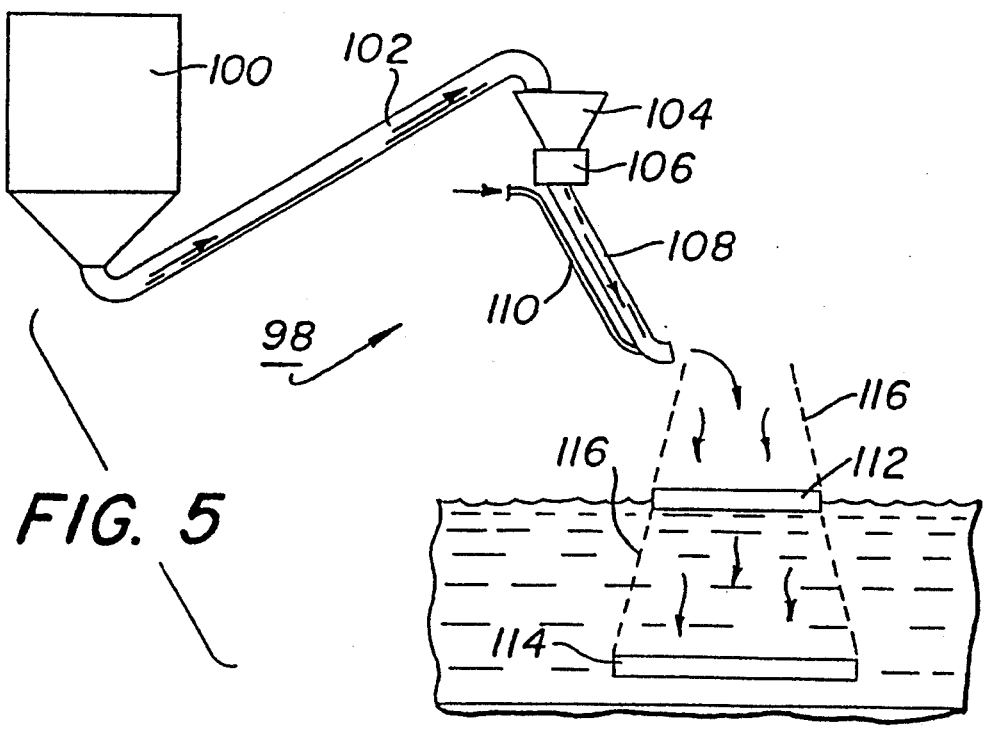
FIG. 5 is a schematic illustration of one embodiment of a feeding apparatus for use in accordance with the present invention.

One example of a preferred feeding device is a feeder 98 illustrated in FIG. 5. Food or other nutrients, such as vitamins and minerals, is supplied from a food or nutrient container 100. The food or nutrients are conveyed by a mechanical or pneumatic conveyor 102 into a weigh hopper 104. A scale and gate assembly 106 includes the appropriate components known to those skilled in the art to monitor the amount of food being released from the weigh hopper and allows the food or nutrients to pass through conduit 108 onto the water using a regulated flow of pressurized gas, preferably air, for example, from a gas ejector 110 to within an assembly comprising one or more feeding rings 112 and feeding trays 114. By regulating the duration and pressure of gas flow, the amount of food or nutrients fed from conduit 108 can be adjusted. The regulation can be manually or automatically controlled by a separate or central control center.

The feeding rings and trays are supported at an appropriate level within the tank and with respect to the surface of the aqueous medium by wires, chains or other support members 116 which are preferably flexible. Feeding rings 112 preferably are arranged as a separate series of interconnected concentric rings of any general shape, such as circular, rectangular or any other shape. Feeding rings 112 are preferably located at the surface and retain food within a given area at or near the surface of the aqueous medium. Feeding tray or trays 114 are disposed below and in general vertical alignment with feeding rings 112. Feeding tray or trays 114 preferably have a generally horizontal surface area greater than the horizontal surface area circumscribed by feeding rings 112 to catch food or nutrient particles which are not ingested. The arrangement of the schematically illustrated feeding rings and tray assembly as shown in FIG. 5 minimizes the loss of uneaten food into the aqueous medium, where it is likely to decay, forming undesirable waste products. One skilled in the art will appreciate that other feeding methods and apparatus may be used.

It is presently preferred that the aquaculture system of the present invention is a closed system, isolated from the extraneous effects of the natural environment so that the environment provided by the system for the primary cultured species may be closely monitored and controlled. Where open tanks are used, for example, the system can still be controlled as and effectively converted to a closed system by providing covers for the tanks or housing the tanks indoors, and using return lines with any necessary associated pumps and valves to recycle treated aqueous medium to the tank after treatment and removal of undesired contaminants and non-essential secondary organisms as generally described with respect to FIG. 1. All processing of the aqueous medium and of the primary cultured species is preferably done in a closed environment.

Further in accordance with the present invention, tank 11 should be provided with means for removing the aqueous medium and any non-essential secondary organisms from tank 11, such as drainage ports, vacuuming devices, and skimmers, for example. Preferably, any means used for removing such material should be designed to operate with minimal stress to the primary cultured species. Cleaning and drainage devices which cause disruptive aqueous medium flow or which may interfere with the normal movements and activity of the primary cultured species should be avoided.

Additionally, as generally described above, in accordance with the present invention, the aquaculture system 10 comprises means for processing the aqueous medium to remove toxins and other contaminants built up in tank 11 and to provide nutrients and other elements necessary to sustain and foster the primary cultured species. It would be appreciated by one skilled in the art that fish, for example, excrete substantial amounts of waste products as a natural consequence of feeding and respiration. Moreover, food, nutrients and other elements introduced into the aqueous medium may build up or go unused, necessitating their removal from the aqueous medium to maintain suitable maintenance and growth conditions for the primary cultured species. Furthermore, in any closed system, outside contaminants may be introduced into the closed system through the failure of the barriers which make the system closed. These new contaminants need to be identified and removed. This system will constantly monitor all unknowns found in the system, whether created within or introduced from outside of the system. These contaminants will be removed from the system.

When a portion of the aqueous medium is removed from tank 11, the aqueous medium is transferred to a particulate removal apparatus 16. The particulate removal apparatus is provided to remove any particulate waste matter, such as living or dead organic matter, cells, debris and other matter which are not dissolved in the aqueous medium. The presently preferred method for particulate removal or filtration is by mechanical filtration using a series of gradually finer screens, membranes, or filter aids which preferably can be reused or recharged or from which the particulate is separated. Such units are static or active screens, membranes made of a variety of filter material and filter aid material, for example diatomaceous earth or magnetic natural or man-made particles, or by centrifugal filtration to remove the particles based on their weight and in turn the needed G force to accomplish the separation and removal. These units are available from companies such as Andritz Sprout-Bauer, Inc., Westfalia Separator AG, Sharples Alfa-Laval Group Sharples Inc., Bird Machine Co, Idreco USA Ltd., Osmonics, Inc., Millipore Corp., Filtrex Inc., Hycor Corp., R.P. Adams Company, Inc. or Coster Engineering, to mention a few. Any other type of particulate removal equipment can be used as particulate removal apparatus 16 in the system of the present invention, as long as it does not introduce contaminants into the medium which cannot be removed in a later stage of filtration or other treatment. It is strongly preferred that particulate removal means 16 be a non-biological means.

Preferably, the aqueous medium is filtered to remove all undesired particulate matter present in the aqueous medium. Any matter allowed to pass through this stage of filtration will have the ability to break down into other substances which will have to be removed from the system within time or the created substance may build to a concentration level which in time will cause the system to fail. Therefore, matter must be removed quickly. This may take a few passes through the particulate removal device to accomplish the removal if the unit is not 100% effective on a single pass. Removal of such particulate matter keeps the water clean and extends the replacement of recharge life of the subsequent treatment apparatus (discussed below) and other components of the aquaculture system of the present invention.

Particulate matter removed using the particulate removal apparatus 16 and discharged through waste outlet conduit 17 in accordance with the present invention may be utilized for a variety of purposes. For example, valuable chemicals may be recovered from particulate matter typically found in aqueous medium. In addition, particulate matter removed from the aqueous medium may be used to feed plants or animals which may, in turn, be used after appropriate preparation as a food source for the cultured species. Nutrients of all types, such as vitamins, essential proteins, carbohydrates and minerals, can be derived by this method. For example, worms are one good food source of feed for aquatic life. Particulate matter removed from the aqueous medium, after processing to sterilize and remove toxins to assure that no contaminants are introduced into the system, may be placed into a drying bed, such as a screen, sand or other porous material for drying into a dried waste product. This waste product, alone or in combination with other waste product, such as grass clippings and waste produce from supermarkets, for example, may be used as a growth medium for worms using conventional techniques and apparatus. As mentioned, all feeds or waste matter going into the aquaculture system of the present invention must be free of living and chemical contaminants associated with the food source or created by the food source. The cultivated worms, after cleaning, sterilizing and processing, such as freezing or grinding into pellets, may then be returned from nutrient source 14 to tank 11 as a high protein feed source for the primary cultivated species.

In accordance with the present invention, it is strongly preferred that no biological filtration is used to filter out particulate matter from the aqueous medium or convert particulate or dissolved matter to non-toxic materials. It is important that where non-essential secondary species are involved with the aquaculture system of the present invention, the non-essential secondary organisms are completely isolated from the primary cultured species and the aqueous medium. As discussed above, for example, where worms are provided as a feed source, they are introduced to the primary cultured species and the aqueous medium only after they are cleaned and substantially free from previously removed particulate matter or other contaminants.

Further in accordance with the present invention, the aquaculture system is provided with a sterilizer 19, which is preferably positioned downstream from the particulate removal apparatus 16. As illustrated in FIG. 1, it may be desired to direct the aqueous medium directly from the tank 11 to the sterilizer 19 by conduit 20 where particulate matter is absent from the aqueous medium or where sterilization of the aqueous medium cannot wait for particulate matter removal, for example. Further, where the particulate removal apparatus is used to remove from the aqueous medium sterilized matter remaining after treatment in the sterilizer, sterilizer 19 would be upstream of particulate removal apparatus 16. In some instances, the particulate removal apparatus 16 may be sufficient to remove non-essential secondary organisms from the aqueous medium and, thereby, act as a sterilizer itself.

The sterilizer should substantially completely purify the aqueous medium, neutralizing, killing and removing all non-essential secondary organisms or overpopulations of essential secondary organisms. Methods suitable for such sterilization include, without limitation, treatment of the aqueous medium by filtration or with ozone, ultraviolet light, chlorine, salt or other appropriate chemical sterilizing agents, for example. Any method of sterilization chosen must be complete in its ability to kill or neutralize and remove the organic matter from the aqueous medium. Thus, the particular method chosen should not allow any contaminant or organic or inorganic chemical which is created or converted from any matter in the aqueous medium to be returned to the tank. It is strongly preferred that the sterilization method chosen be a non-biological method. Combinations of sterilizing techniques are preferred, such as the use of a particle size filter with ultraviolet light or ozone and a chemical sterilizing agent.

One skilled in the art will appreciate that other methods which are effective to kill or remove all non-essential secondary organisms or overpopulations of essential secondary organisms (and where necessary, even overpopulations of the primary species) may be used in accordance with the present invention. Any chemical or compound introduced for or derived as a result of sterilization, such as ozone or salt, as well as any killed or neutralized organisms, should be removed by the sterilizer or at a later stage of the system before the aqueous medium is returned to the tank.

It will be appreciated by one of ordinary skill in the art that aqueous medium removed from tank 11 of the aquaculture system, treated in the particulate removal apparatus 16 to remove particulate matter, followed by sterilization in the sterilizer 19 to kill and/or remove secondary organisms will be substantially clean and free from debris, organic matter, harmful bacteria and viruses or any other organic matter adverse to the primary species, and may generally be considered to be clean aqueous medium. Any contaminants not previously removed by the particulate matter removal equipment 16 or the sterilizer 19 should be removed from system 10 by a non-biological toxin removal device or apparatus 24.

Apparatus and techniques suitable for further extracting or removing chemicals, toxins and other compounds from the aqueous medium include, without limitation, dialysis apparatus (such as electrodialysis units), all forms of chromatography, flow-over resin systems for proteins and amino acids, for example, osmotic membranes, polymer binding, centrifugal compression, scavenger agars, such as negative charged catch protein-impregnated agars, magnetophoresis, electrophoresis, paired-ion exchange resins, extraction by reverse osmosis membranes, nitrous oxide injection, chloride injection, use of free or immobilized enzymes such as urease, ultrafiltration, such as colloid-enhanced ultrafiltration, demineralization, deionization, other sorption techniques including adsorption and absorption techniques, precipitation, and dual catalyst systems (catalytic oxidation and catalytic decomposition), for example. One chemical removing apparatus presently preferred for use in accordance with the present invention is an inert chromatography or membrane system available from du Pont or Bio-Rad. Any very small particulate matter remaining may be removed by additional centrifugal separation or by electromagnetic adsorption techniques using, for example, magnetite or another electromagnetic resin.

In addition, many biochemical substances, medicines, drugs, or chemicals which may be waste products in the present system but which may be beneficial in other environments, or for other species, can be removed at this stage. Examples of useful waste and chemical products are ammonia hydroxide, biopolymers, derivatives from the protective slime layer of fish, which can be used in the production of emulsifiers, moisturizers, thickeners, lubricants and fabrics, medicines (such as eptatretin from hagfish, bonellinin—a cancer control and birth control drug from the marine peanut worm, or acyclovin, manoalide and didemim B, all from marine sponge, vitamins, essential minerals or trace elements from algae, proteins, carbohydrates and lipids, agar, pigments, dyes, chitin, and bioluminescence derivatives, to mention a few. All extractable chemicals can be concentrated in a pure form without the possibility of a pollutant altering or being attached to the chemical, which can be the case if the chemical comes from a natural or uncontrolled environment.

Once the aqueous medium is cleaned and sterilized and once all chemicals, toxins, gases and other compounds which are not desired for this system or which are desired for other environments or uses have been removed, it is preferred in accordance with the present invention to add necessary or desirable chemicals and other materials into the aqueous medium to levels required or suitable for maintaining and growing the primary cultured species. Alternatively, other treatments of the aqueous medium may be required or desired for the proper survival and growth of a particular primary species. Such treatment preferably may take place in the supplemental treatment station 39 or such materials may be added from source 33 of such materials.

In view of the present disclosure, one skilled in the biological arts will .be able to readily identify the chemicals and other materials desired and/or necessary for the maintenance and growth of the primary cultured species. These chemicals and other materials are preferably added after the chemical and toxin removal stage and may be done at source 33 or in the supplemental treatment station 39, preferably in conjunction with the steady state chamber 32. One example of an element necessary for the maintenance or growth of an aerobic cultured species is dissolved oxygen. Dissolved oxygen may be added at supplemental treatment station 39 by a gas injector, which may be of a type illustrated in FIG. 6 and described in detail hereinafter.

The new medium chamber 28, new medium source 29, other material source 33 and supplemental treatment station apparatus 39 are positioned downstream from the non-biological toxin removal device 24, although the particular placement of the new medium receiving chamber 28, other material source 33 and the supplemental treatment station 39 is not believed to be critical.

Aqueous medium treated, added or renewed at either the toxin removal device 24, the new medium receiving chamber 28, the supplemental treatment station 39 or the steady state chamber 32 may then be returned to the tank 11 along with any additional aqueous medium desired to replace aqueous medium lost through evaporation and/or processing during the cleaning, sterilization and removing steps discussed above. To allow the appropriate time and conditions for steady state adjustment of the aqueous medium, the treated aqueous medium should be routed to the steady state chamber 32 for appropriate monitoring before being returned to tank 11.

Figure 6:
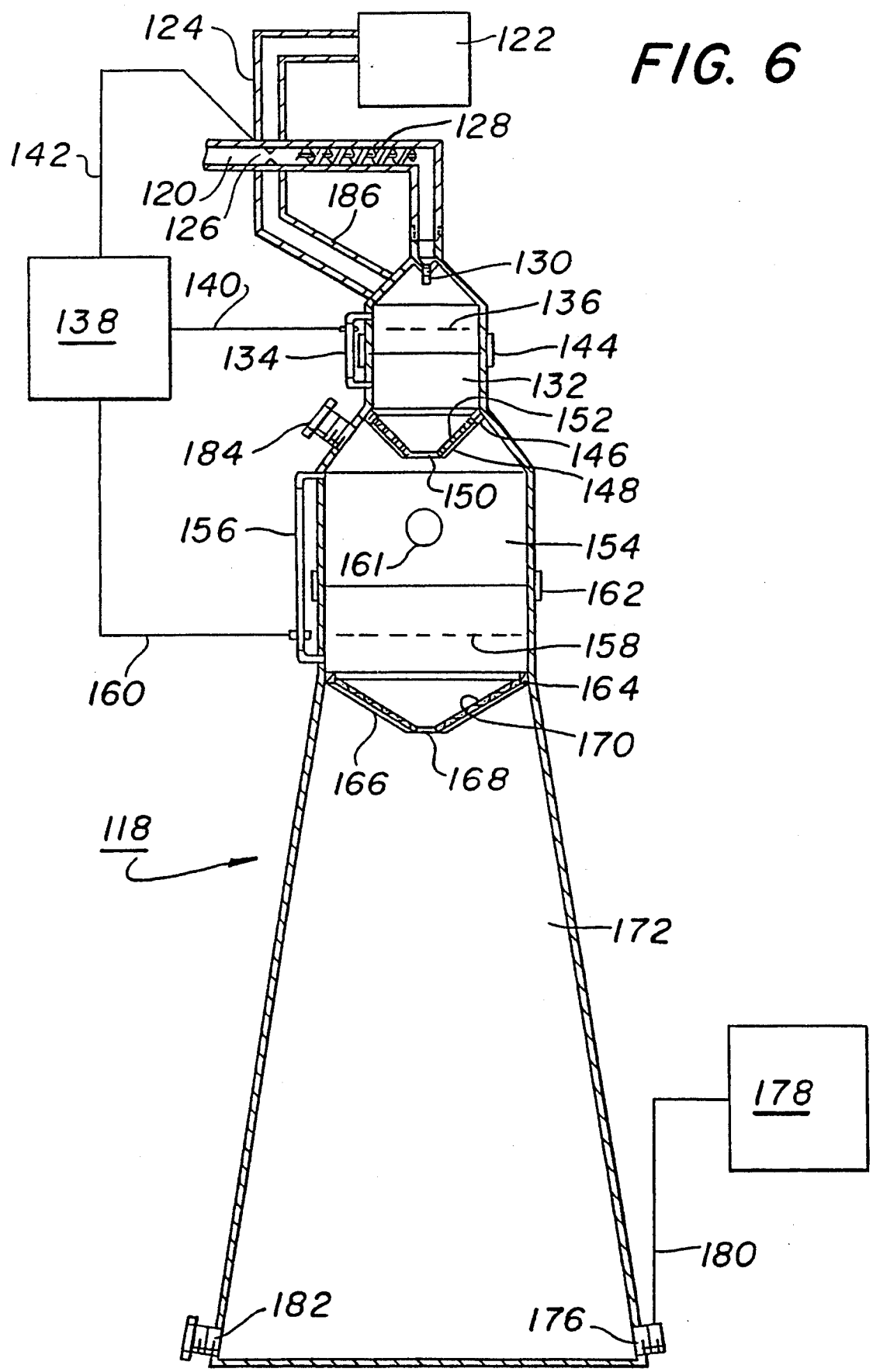
FIG. 6 is a vertical cross-sectional view of one embodiment of a gas injector for use in conjunction with the steady state system of the present invention.

Since dissolved oxygen is a typical and important ingredient to be added to the aqueous medium to maintain many species of fish as the primary cultured species, a description of one embodiment of a preferred type of a gas injector 118 for introducing oxygen in conjunction with steady state chamber 32 will now be described with reference to FIG. 6. Other gases could be introduced using gas injector 118.

Gas injector 118 is connected to the appropriate component of the aquaculture system 10, such as steady state chamber 32, by conduit 120 through which the aqueous medium (hereinafter sometimes referred to as merely the "medium") flows. Gas, for example oxygen, from any suitable source 122 passes through conduit 124 into gas injection port 126 within conduit 120. The gas/medium mixture moves through conduit 120 and is mixed by static mixer 128. The gas/medium mixture is atomized or injected through nozzle 130 into an upper section chamber 132.

Upper section chamber 132 is equipped with a level indicator 134 to indicate the high level of the gas/medium interface shown, for example, by dashed line 136. This level may be monitored by a monitor 138 connected by a wire 140 to an appropriate sensor. The monitor may also be connected by a wire 142 to an appropriate controller, such as a remote controlled valve, associated with gas injection port 126.

Upper section chamber 132 may come in sections held together by a disconnect lock-and-seal assembly 144 which allows the upper section to be taken apart and reassembled, for insertion of deflectors or screens, cleaning, maintenance or the like.

An internal, preferably circumferential supporting flange 146 is welded or otherwise mounted within the lower portion of upper section chamber 132. An optional, generally inverted conical deflector 148 may be supported by the flange 146. An opening 150 is formed at the bottom of deflector 148. If desired, a screen or filter 152 may be supported on deflector 148, or, if there is no deflector, screen 152 may be supported directly by flange 146.

Integrally formed with or connected to upper section chamber 132 is a lower section chamber 154. Lower section chamber 154 has a larger cross-sectional area and volume than upper section chamber 132. A level indicator 156 indicates the low level gas/medium interface as represented by the dashed line 158. A wire 160 connects monitor 138 to a low level sensor so that the monitor can control the gas injection rate based on both the low and high levels of gas/medium interface within injector 118.

A view port 161 may be provided in the housing so that the inside of the chamber may be visually inspected. Lower section chamber 154 may be made in two parts and held together by a disconnect lock-and-seal assembly 162.

An internal, preferably circumferential supporting flange 164 is mounted in a lower portion of lower section chamber 154. An optional inverted conical deflector 166 having an opening 168 in the bottom thereof, and/or an optional screen or filter 170 may be supported by flange 164.

A base section 172 which is wider than and has a greater cross-sectional area and volume than upper section chamber 132 and lower section chamber 154 is integrally formed with or connected to the lower portion of lower section chamber 154. A dissolved gas-/aqueous medium outlet 176 allows the aqueous medium containing the dissolved gas to flow out of injector 118 back to the appropriate component of aquaculture system 10, such as steady state chamber 32. A monitor 178 connected to an appropriate dissolved gas sensor by a wire 180 monitors the amount of dissolved gas contained in the treated aqueous medium. Signals are sent by a wire (not shown for clarity) to gas injection port 126 to control the amount of oxygen or other dissolved gas to be added so that the dissolved gas content within the aqueous medium exiting gas injector 118 is at an appropriate level depending on the particular type of primary species being cultured.

A drain port and cap 182 are provided in a lower portion of base section 172. A fitting 184 may be formed in an upper portion of lower section chamber 154 to allow access for additional aqueous medium or a mixer unit or the supply of to increase the shearing action on gas bubbles in chamber 154. An excess gas return conduit 186, with appropriate valving which may be controlled by monitor 138 and/or 178, allows the return of excess gas from the upper portion of upper section chamber 132 to gas injection port 126.

Gas injector 118 operates as follows. Gas from source 122 is injected into the aqueous medium within conduit 120 where the mixture is mixed by static mixer 128. The mixture flows through nozzle 130 into upper section chamber 132, downwardly into larger, lower section chamber 154, and then into still larger base section 172. Thus, the gas/medium mixture generally flows downwardly from the top of the unit. Gas will rise and bubbles will form and move upwardly against the current of the downwardly flowing medium as the flow rate begins to slow. This causes a shearing effect and reduces the size of the gas bubbles to a size smaller than the size of the bubbles created by the static mixer 128 and atomizer or nozzle 130. The shearing action increases the surface area of the gas bubbles, allowing more area for the gas to be dissolved into the aqueous medium. The floating action of the gas bubbles against the downward current of the medium prolongs the time the gas has to be dissolved. The deflectors and screens add to the shearing effect and further reduce the bubble size. In this way, there is a very effective injection, mixing and dissolution of any desired gas within the aqueous medium.

One skilled in the biological arts will appreciate in view of the present disclosure that other chemicals, toxins and other compounds harmful or beneficial to a particular primary cultured species should be monitored and adjusted to provide optimal conditions for the maintenance and/or growth of the primary cultured species in accordance with the present invention.

It is presently preferred to further provide the aquaculture system of the present invention with control means for stabilizing the cleaned and sterilized aqueous medium and controlling the system with regard to predetermined parameters suitable for maintaining and growing the primary cultured species before the aqueous medium is returned to the tank 11. These parameters generally comprise equipment operation, environmental stimuli and/or the quality of the aqueous medium, including the nature, content and/or value in the aqueous medium of certain chemicals and elements, such as ammonia, nitrogen and urea, and other dissolvable or microparticulate matter which may not have been removed by the previous treatment apparatus 16 and 19. Chemicals, toxins and other compounds which should be monitored and removed or added depending on their effect on the primary cultured species include, without limitation, glucoproteins, amino acids, lipids, hydrocarbons, polypeptides, alpha and kappa chain proteins, polysaccharides, ammonia, nitrogenous compounds, carbon base compounds, free and dissolved gases (such as oxygen, nitrogen, carbon dioxide, hydrogen sulfide) and acids and bases, among many others, for example.

Suitable monitoring equipment is readily available, such as the equipment used to monitor the indicated parameters in chemical and biological laboratories and industrial plants. Examples include, without limitation, equipment using the techniques of mass spectroscopy, atomic absorption, gas chromatography, pH determination, and the like. Each monitoring component can be monitored separately, if desired. However, to provide for better overall control of the aquaculture system of the present invention, the monitoring equipment should be integrated into an overall control system as is done in many computer-controlled installations for various types of monitoring and processing equipment in various fields.

Although the aspects of the aquaculture system discussed above may be monitored and controlled using many techniques presently in existence or which may be developed in the future, it is presently preferred to monitor and control the aquaculture system of the present invention based on the biomass of the primary species and any essential secondary organisms within the particular section or sections 58 of tank 11. Such monitoring of the biomass will indicate the appropriate size of each section 58 and the volume of the medium within each section. Such monitoring of the biomass will also allow the control and adjustment of the functions of each stage of the various treatments of the aqueous medium so as not to overstress the system by undue extremes from any one portion of the aquaculture system. For any closed body of water or other aqueous medium in which an organism is placed, the organism's biomass can be calculated by monitoring the displaced water volume in relation to a known constant water volume. One skilled in the art will be able to derive other methods resulting in the same biomass calculation and results.

The present invention may be embodied in other specific forms without departing from the spirit or essential attributes thereof and, accordingly, reference should be made to the appended claims, rather than to the foregoing specification, as indicating the scope of the invention.

I claim:

1. A closed aquaculture system for maintaining and growing a single primary cultured species and secondary organisms essential to growth and survival of the primary species comprising
    (a) a tank for holding an aqueous medium, the primary species and any essential secondary organisms;
    (b) means for adding nutrients to the tank;
    (c) means for selectively removing the aqueous medium from the tank;
    (d) means for removing particulate matter from the aqueous medium removed from the tank;
    (e) means for sterilizing the aqueous medium removed from the tank;
    (f) non-biological means for removing toxins from the aqueous medium removed from the tank;
    (g) means for bringing the aqueous medium removed from the tank to a steady state suitable for the growth and survival of the primary species; and
    (h) means for returning the aqueous medium to the tank after the aqueous medium is treated by any or all of the means of components (d), (e), (f) and (g).

2. The aquaculture system according to claim 1, further comprising
    (i) control means for monitoring and adjusting the system and aqueous medium within predetermined parameters suitable for the growth and survival of the primary species.

3. The aquaculture system according to claim 2, wherein the parameters monitored and adjusted by the control means comprise at least one of equipment operation, environmental stimuli and quality of the aqueous medium.

4. The aquaculture system according to claim 1, further comprising
    (i) means for stimulating the growth of the primary species.

5. The aquaculture system according to claim 1 wherein the tank includes at least one movable wall divider.

6. The aquaculture system according to claim 1 wherein the tank includes at least one movable drain.

7. The aquaculture system according to claim 1 wherein the means for removing particulate matter is a non-biological particulate removal means.

8. The aquaculture system according to claim 1 wherein the means for removing particulate matter is a centrifugal separator.

9. The aquaculture system according to claim 1 wherein the means for removing particulate matter is a particle size filter.

10. The aquaculture system according to claim 1 wherein the means for sterilizing the aqueous medium is a non-biological sterilizing means.

11. The aquaculture system according to claim 1 wherein the means for sterilizing the aqueous medium is selected from the group consisting of a particle size filter, ultraviolet light, ozone and chemical sterilizing agent.

12. The aquaculture system according to claim 1 wherein the means for sterilizing the aqueous medium is selected from the group consisting of first and second combination sterilizing means, wherein the first combination sterilizing means is a particle size filter in combination with ultraviolet light and the second combination sterilizing means is ozone in combination with a chemical sterilizing agent.

13. The aquaculture system according to claim 1 wherein the non-biological means for removing toxins is a means employing a technique selected from the group consisting of ion exchange, electrodialysis, sorption, chromatography and ultrafiltration.

14. The aquaculture system according to claim 1 wherein the means for bringing the aqueous medium to a steady state comprises non-biological means.

15. The aquaculture system according to claim 1 wherein the means for bringing the aqueous medium to a steady state includes at least one of temperature control means, water quality means and gas content adjusting means.

16. The aquaculture system according to claim 15 wherein the gas content adjusting means is a gas injector having an upper section and a base section of greater cross-sectional area and volume than the upper section to allow gas to diffuse upwardly through aqueous medium flowing downwardly through the injector.

17. The aquaculture system according to claim 16 wherein the gas injector includes an inline mixer.

18. The aquaculture system according to claim 16 wherein the gas injector includes an internal atomizer.

19. The aquaculture system according to claim 1 wherein the means for adding nutrients comprises a nutrient hopper, means for conveying the nutrient from the hopper to a weighing means and gas discharge means for discharging the nutrient from the weighing means to a nutrient containment means within the tank.

20. The aquaculture system according to claim 19 wherein the gas discharge means comprises a gravity feed tube extending from the weighing means and a gas conduit connected to a source of pressurized gas and to a lower portion of the gravity feed tube.

21. The aquaculture system according to claim 19 wherein the containment means is at least one ring disposed at the surface of the aqueous medium and at least one tray generally vertically aligned with and disposed below the ring.

22. The aquaculture system according to claim 21 wherein the containment means includes a plurality of concentric rings.

23. The aquaculture system according to claim 1 wherein each of the means for removing particulate matter, the means for sterilizing the aqueous medium and the means for bringing the aqueous medium to a steady state is a non-biological means.

24. A method for maintaining and growing a single primary cultured species comprising the steps of
(a) supplying the primary species to a tank containing an aqueous medium;
(b) adding nutrients to the tank;
(c) continuously removing portions of the aqueous medium from the tank for treatment until eventually all of the aqueous medium is removed from the tank;
(d) removing particulate matter from the removed portion of the aqueous medium;
(e) sterilizing the removed portion of aqueous medium to neutralize and remove nonessential secondary organisms from the removed portion;
(f) removing toxins from the removed portion of aqueous medium without biological filtration;
(g) bringing the aqueous medium removed from the tank to a steady state suitable for growth and survival of the primary species;
(h) returning the aqueous medium to the tank after any or all of treatment steps (d), (e), (f) and (g) have been performed.

25. The method according to claim 24, further comprising monitoring and adjusting the aqueous medium within parameters suitable for maintaining and growing the primary species.

26. The method according to claim 25 wherein the monitored and adjusted parameters comprise at least one of equipment operation, environmental stimuli and quality of the aqueous medium.

27. The method according to claim 24 wherein step (d) is non-biological particulate matter removing step.

28. The method according to claim 24 wherein step (e) is a non-biological sterilizing step.

29. The method according to claim 24 wherein step (g) comprises controlling and adjusting temperature within the tank, quality of the aqueous medium and gas content within the aqueous medium.

30. The method according to claim 24 wherein step (d) is a non-biological particulate removing step; wherein step (e) is a non-biological sterilizing step; and step (g) is a non-biological step of bringing the aqueous medium removed from the tank to a steady state.

31. The method according to claim 24 wherein the primary cultured species comprises fish of a predetermined species.

* * * * *